No. 778,690. PATENTED DEC. 27, 1904.
M. H. MEYER.
FERTILIZER DISTRIBUTER.
APPLICATION FILED AUG. 3, 1904.

2 SHEETS—SHEET 1.

Witnesses
C. R. Reichenbach.
W. C. Keyes.

Inventor
M. H. Meyer,
by
Chandler & Chandler
Attorneys

No. 778,690. PATENTED DEC. 27, 1904.
M. H. MEYER.
FERTILIZER DISTRIBUTER.
APPLICATION FILED AUG. 3, 1904.

2 SHEETS—SHEET 2.

Witnesses
C. K. Reichenbach.
W. C. O. Keyer.

Inventor
M. H. Meyer,
by
Chandlee & Chandlee
Attorneys

No. 778,690. Patented December 27, 1904.

UNITED STATES PATENT OFFICE.

MARTIN H. MEYER, OF PENDER, NEBRASKA.

FERTILIZER-DISTRIBUTER.

SPECIFICATION forming part of Letters Patent No. 778,690, dated December 27, 1904.

Application filed August 3, 1904. Serial No. 219,360.

*To all whom it may concern:*

Be it known that I, MARTIN H. MEYER, a citizen of the United States, residing at Pender, in the county of Thurston, State of Nebraska, have invented certain new and useful Improvements in Fertilizer-Distributers; and I do hereby declare the following to be a full, clear, and exact description of the invention, such as will enable others skilled in the art to which it appertains to make and use the same.

This invention relates to fertilizer-distributers, and has for its object to provide a machine of this nature which will distribute the fertilizer evenly and which will be simple of construction. The difficulty with such machines has heretofore lain in the tendency to distribute the fertilizer more thickly at the center of the discharging-roller than at the ends, and, as mentioned above, the primary object of the present invention is to correct this difficulty.

Figure 1:
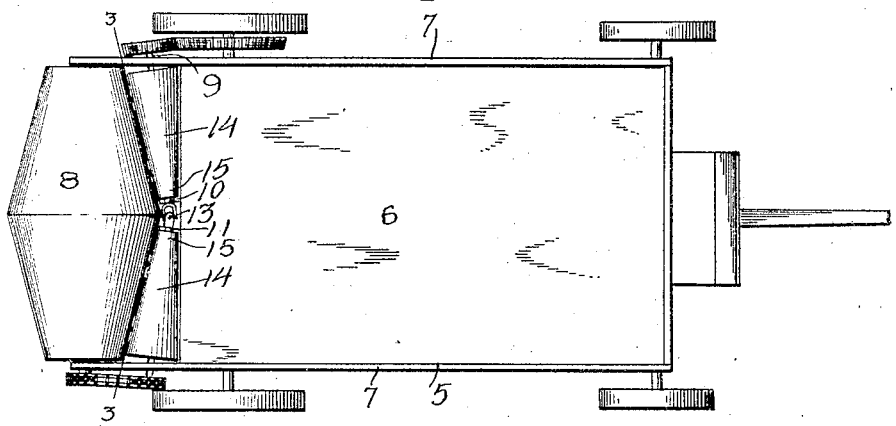
Figure 2:
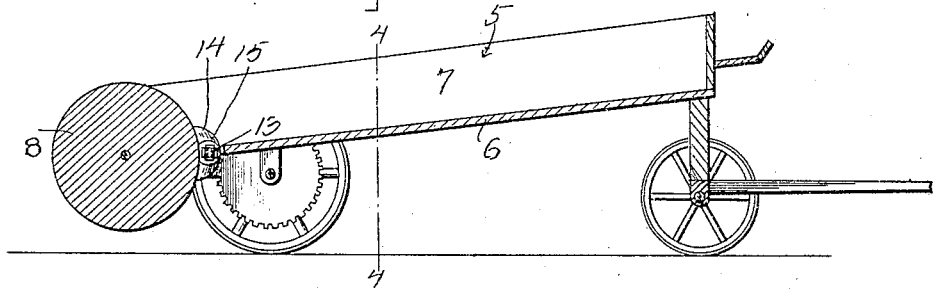
Figure 3:
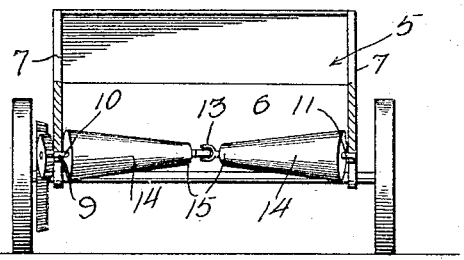
Figure 4:
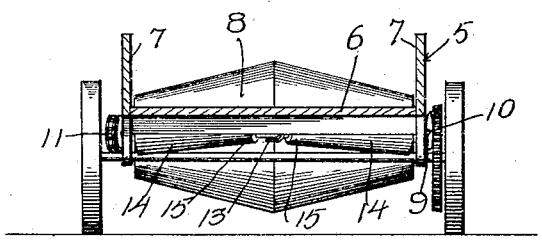

In the drawings forming a portion of this specification, and in which like numerals of reference indicate similar parts in the several views, Figure 1 is a top plan view of the present invention. Fig. 2 is a longitudinal section of Fig. 1. Fig. 3 is a section on line 3 3 of Fig. 1, and Fig. 4 is a transverse section on line 4 4 of Fig. 2.

Referring now to the drawings, the present invention comprises a wheeled body 5, the bottom 6 of which slants downwardly and rearwardly, as shown. The sides 7 of the body extend rearwardly beyond the bottom 6, and journaled between the rearwardly-extending portions and spaced from the rearward end of the bottom is a roller 8, which is tapered from its center toward its ends. Journaled at its ends in the rearwardly-extending portion of the sides are the ends of a shaft 9, including two sections 10 and 11, which are connected by a universal joint 13, and these sections 10 and 11 lie parallel to the tapered portions of the roller 8 and between this roller and the bottom 6 of the body. Disposed upon each of the sections 10 and 11 is a cone 14, the minor ends 15 of which are directed inwardly, and the shaft 9 is geared to the roller 8 to run in the same direction therewith, and the roller 8 is connected with one of the wheels of the body for rotation thereby rearwardly.

In operation fertilizer is disposed upon the slanting bottom 6 of the body 5, down which it passes to the cones 14, which deposit it upon the roller 8, this roller throwing it from the rearward end of the machine, and by reason of the fact that the roller is tapered toward its ends an equal amount of fertilizer is thrown from each of its beveled portions, thus equally distributing the fertilizer.

What is claimed is—

1. A fertilizer-distributer comprising a body open at one end a roller tapered from its center toward its ends disposed with its longitudinal axis parallel to the open end of the body and spaced therefrom, cones disposed between the tapered portions of the roller and the rearward end of the body and means for revolving the cones and roller away from the body.

2. A fertilizer-distributer comprising a body open at one end and having a bottom slanting downwardly toward the open end, a roller tapered from its center toward its ends revolubly disposed with its longitudinal axis parallel to the open end of the body and spaced from the end of the bottom, a shaft comprising two jointed sections revolubly disposed between the roller and the bottom, a cone disposed upon each section of the shaft between a slanting face of the roller and the bottom and means for revolving the cones and roller away from the body.

In testimony whereof I affix my signature in presence of two witnesses.

MARTIN H. MEYER.

Witnesses:
JOHN H. BEHRENS,
JOHN A. HEYNE.